UNITED STATES PATENT OFFICE.

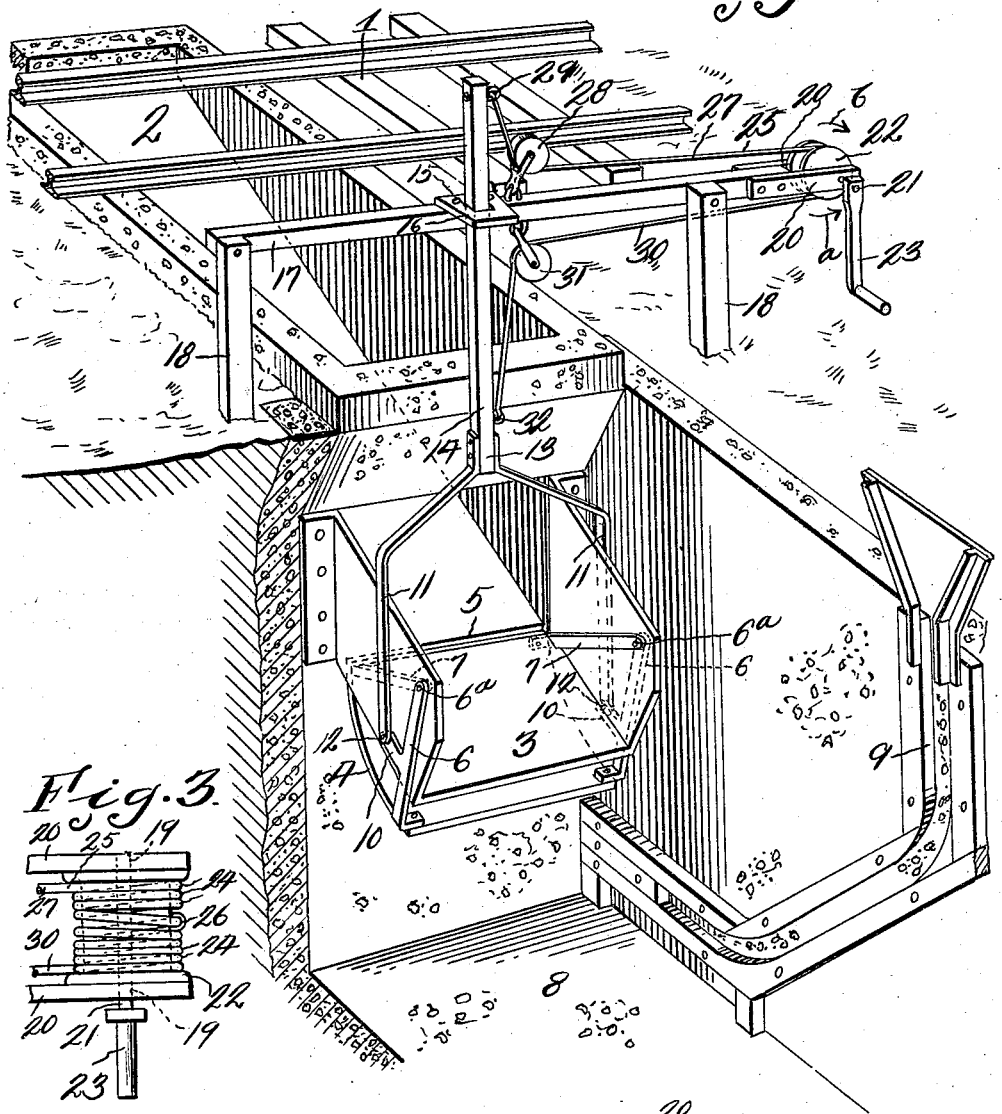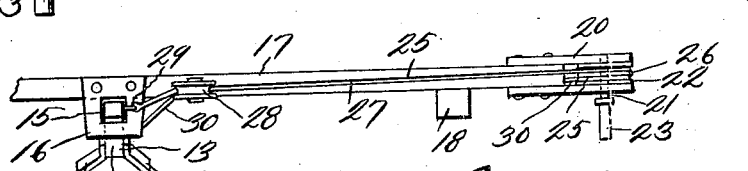

IRWIN D. LANDIS, OF SOUTH BEND, INDIANA, ASSIGNOR TO UNIVERSAL CONVEYOR CO., OF SOUTH BEND, INDIANA, A CORPORATION OF INDIANA.

CHUTE-GATE-OPERATING MECHANISM.

1,417,611.  Specification of Letters Patent.  Patented May 30, 1922.

Application filed August 22, 1921. Serial No. 494,268.

*To all whom it may concern:*

Be it known that I, IRWIN D. LANDIS, a citizen of the United States, residing at South Bend, in the county of St. Joseph and State of Indiana, have invented certain new and useful Improvements in Chute-Gate-Operating Mechanism, of which the following is a specification.

The invention relates to operating mechanisms for chute gates particularly for gates of the undercut type, and provided with an upwardly extending controlling member slidably mounted in a guide, said controlling member having connected thereto at points spaced from the guide the ends of a cable, which cable passes over pulleys adjacent the guide and over an operating drum disposed at a point spaced from the guide. Also to provide means whereby said operating drum may be rotated and whereby the cable may be prevented from slipping on the operating drum during the rotation thereof.

A further object is to provide an upwardly extending bar vertically movable and guidable for controlling a chute gate, said bar being controlled in its upward and downward movement by means of a cable extending around an operating drum and having its ends passing over pulleys and connected to the vertically guidable member at spaced points.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a perspective view of a railroad dump pit showing the chute and the controlling mechanism applied thereto.

Figure 2 is a top plan view of the controlling mechanism.

Figure 3 is an enlarged view of the operating drum, more clearly showing the cable carried thereby.

Referring to the drawings, the numeral 1 designates a railroad track, and 2 a transversely disposed hopper, into which coal and the like is dumped from cars either by side, or bottom dump cars, or in any other suitable manner. The hopper 2 terminates in a chute 3 which chute is controlled by a segmentally shaped undercut gate which works upwardly through the transversely disposed slot 5 and is carried by the arms 6 and 7. The arms 6 are disposed outside of the chute 2 and the arms 7 inside, thereby supporting the segmentally shaped gate 4 adjacent its marginal edges and in such a manner that said gate will work freely upwardly and downwardly through the slot 5. Chute 3 extends into a pit 8, into which pit a conveyor bucket is lowered and guided to a position below the chute so that material may be easily and quickly deposited therein; said conveyor bucket being of conventional form where rollers are disposed on the sides thereof and received by a guide 9, said bucket is not shown. The arms 6 are provided with inwardly extending arms 10, to the inner ends of which upwardly extending and converging arms 11 are pivotally connected at 12. Arms 11 have their upper ends connected to the lower end 13 of a vertically movable guide bar 14, which bar extends through an enlarged opening 15 in a guide plate 16. Guide bar 14 is guided in its vertical movement during a gate closing and opening operation by the guide plate 16, however the opening 15 is enlarged for the reason that as the arms 6 and 7 swing on their pivotal points 6ª, the pivotal points 12 will swing in an arc, therefore an enlarged guide opening 15 is necessary for proper functioning of the bar 14 in its upward and downward movement. The guide plate 16 is secured to a horizontally disposed bar 17 carried by standards 18, and rotatably mounted in bearings 19 of extensions 20 carried by the bar 17 is a shaft 21, to which shaft is secured an operating drum 22. A crank 23 is carried by the shaft 21 and by means of which crank the shaft 21 and its drum 22 may be rotated in any direction desired. Extending around the drum 22 is a plurality of convolutions 24 of an operating cable 25, one of said convolutions being secured at 26 to the drum for preventing slipping of the cable on the drum incident to stretching thereof during a gate opening or closing operation. The portion 27 of the cable 25 extends inwardly in the direction of the guide plate 16 and passes under a pulley 28 carried by the bar 17 adjacent the plate and thence upwardly and has its end connected as at 29 adjacent the upper end of the bar 14. The portion 30 of the cable which passes under the drum 22 extends in the direction of the plate 16 and passes over a pulley 31 carried by the bar 17 adjacent the plate 16 and thence downwardly and has its end connected as at 32 to the bar 14 adjacent its lower end 13.

It will be seen that when the operator rotates the drum 22 in the direction of the arrow *a* that an upward pull will be imparted on the guide bar 14, and that the undercut gate 14 will be closed, also that when the drum is rotated in the direction of the arrow *b* that a downward pull will be imparted on the bar 14 thereby forcing the under cut gate 4 downwardly and allowing material within the hopper 2 to pass through the chute 3 and discharge into a conveyor bucket within the pit 8.

From the above it will be seen that a chute gate operating mechanism is provided which is simple in construction and one wherein a chute gate located within a pit may be easily and quickly controlled from a position adjacent one side of the pit and hopper, thereby allowing the filling of the conveyor buckets to be controlled by a single operator from a position where he can observe the entire operation at all times.

The invention having been set forth what is claimed as new and useful is:—

1. The combination with a chute gate having an upwardly extending bar for controlling said gate, said bar being slidably mounted in a guide, of an operating mechanism for moving said bar upwardly and downwardly, said operating mechanism comprising an operating drum spaced from the bar, a cable extending around said operating drum, pulleys adjacent said bar, the ends of said cable extending over said pulleys and connected to the operating bar at points spaced from its guide.

2. The combination with a chute gate of a hopper located in a pit, of an operating mechanism for operating said gate from a point above the pit and hopper, said mechanism comprising a vertically disposed bar for controlling the gate in its upward and downward movement, said bar being slidably mounted in a guide disposed above the hopper, and cable and drum means whereby said bar may be forced upwardly and downwardly from a point adjacent the pit.

3. The combination with a chute gate of a hopper, of an operating mechanism for operating said gate, said mechanism comprising a vertically disposed bar connected to the gate for moving the same upwardly and downwardly, said bar being slidably mounted in a guide, an operating drum located at a point spaced from the guide, pulleys located adjacent the guide, a cable extending around the operating drum, the ends of said cable extending over the pulleys and connected to the bar at points spaced from its guide.

4. The combination with a chute gate of a hopper located in a pit, of an operating mechanism for operating said gate from a point above the pit and hopper, said mechanism comprising a vertically movable and guidable bar, the lower end of said bar being connected to the gate, the upper end of said bar being slidably mounted in a guide disposed above the hopper and means whereby said bar may be moved upwardly or downwardly for controlling the gate.

5. The combination with a chute gate of a hopper located in a pit, of an operating mechanism for operating said gate from a point above the pit and hopper, said mechanism comprising a vertically movable and guidable bar, the lower end of said bar being connected to the gate, a guide for guiding the upper end of said bar, cable connections with said bar and means for controlling said cable connections from a point adjacent one side of the pit for moving said bar upwardly and downwardly.

In testimony whereof I affix my signature.

IRWIN D. LANDIS.